(12) United States Patent
Mukai et al.

(10) Patent No.: US 10,710,415 B2
(45) Date of Patent: Jul. 14, 2020

(54) TIRE

(71) Applicant: Sumitomo Rubber Industries, Ltd., Kobe-shi, Hyogo (JP)

(72) Inventors: Tomoyuki Mukai, Kobe (JP); Naoya Nagahara, Kobe (JP); Shingo Nobukuni, Kobe (JP); Eiki Osawa, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 427 days.

(21) Appl. No.: 15/612,753

(22) Filed: Jun. 2, 2017

(65) Prior Publication Data

US 2017/0368882 A1 Dec. 28, 2017

(30) Foreign Application Priority Data

Jun. 24, 2016 (JP) ................................ 2016-125162

(51) Int. Cl.
*B60C 11/03* (2006.01)
*B60C 11/11* (2006.01)
(Continued)

(52) U.S. Cl.
CPC ...... *B60C 11/0302* (2013.01); *B60C 11/0304* (2013.01); *B60C 11/0306* (2013.01);
(Continued)

(58) Field of Classification Search
CPC .... B60C 11/302; B60C 11/304; B60C 11/306
See application file for complete search history.

(56) References Cited

U.S. PATENT DOCUMENTS

2010/0116393 A1 5/2010 Miyazaki
2012/0118454 A1 5/2012 Nagayasu et al.
(Continued)

FOREIGN PATENT DOCUMENTS

EP 2781374 A2 9/2014
JP 2008-273451 A 11/2008
(Continued)

OTHER PUBLICATIONS

Extended European Search Report, dated Nov. 3, 2017, for European Application No. 17174870.0.

*Primary Examiner* — Jacob T Minskey
*Assistant Examiner* — Melody Tsui
(74) *Attorney, Agent, or Firm* — Birch, Stewart, Kolasch & Birch LLP (57) ABSTRACT

A tire includes a tread portion being provided with a circumferentially and continuously extending outboard shoulder main groove, a circumferentially and continuously extending outboard crown main groove disposed between the outboard shoulder main groove and a tire equator, and an outboard middle land portion disposed between the outboard shoulder main groove and the outboard crown main groove. The outboard middle land portion is provided with a plurality of first outboard middle lug grooves extending from the outboard crown main groove and terminating within the outboard middle land portion, and a plurality of second outboard middle lug grooves extending from the outboard shoulder main groove and terminating within the outboard middle land portion, wherein the second outboard middle lug grooves are larger than the first outboard middle lug grooves in length in a tire axial direction.

19 Claims, 6 Drawing Sheets

(51) Int. Cl.
*B60C 11/12* (2006.01)
*B60C 11/04* (2006.01)

(52) U.S. Cl.
CPC ........... *B60C 11/0311* (2013.01); *B60C 11/04* (2013.01); *B60C 11/11* (2013.01); *B60C 11/12* (2013.01); *B60C 11/1204* (2013.01); *B60C 11/1236* (2013.01); *B60C 2011/039* (2013.01); *B60C 2011/0341* (2013.01); *B60C 2011/0381* (2013.01); *B60C 2011/0388* (2013.01)

(56) References Cited

U.S. PATENT DOCUMENTS

| | | | |
|---|---|---|---|
| 2013/0167994 A1* | 7/2013 | Hada | B60C 11/0306 |
| | | | 152/209.8 |
| 2013/0167997 A1* | 7/2013 | Hayashi | B60C 11/0306 |
| | | | 152/209.18 |
| 2014/0090759 A1 | 4/2014 | Tanaka | |
| 2014/0283967 A1* | 9/2014 | Inoue | B60C 11/12 |
| | | | 152/209.18 |
| 2016/0075184 A1 | 3/2016 | Kato | |
| 2017/0120688 A1 | 5/2017 | Murata | |

FOREIGN PATENT DOCUMENTS

| | | |
|---|---|---|
| JP | 2013-139166 A | 7/2013 |
| JP | 2015-231812 A | 12/2015 |
| JP | 2016-107912 A | 6/2016 |
| WO | WO 2015/186443 A1 | 12/2015 |

\* cited by examiner

TIRE

BACKGROUND ART

Field of the Invention

The present invention relates to tires, and more particularly to a tire capable of improving on-snow performance while maintaining steering stability on dry road.

Description of the Related Art

For example, Japanese Unexamined Patent Application Publication No. 2013-139166 discloses a tire including an outboard middle land portion disposed between a pair of inboard and outboard main grooves, the outboard middle land portion being provided with first lug grooves which are connected to the inboard main groove and second lug grooves which are connected to the outboard main groove, in order to improve on-snow performance while maintaining steering stability on dry road.

Unfortunately, in the tire described above, the first lug grooves and the second lug grooves have substantially the same lengths. The lug groove construction as such tends to show low cornering performance on snow road since snow columns formed by the second lug grooves with the main groove are small.

SUMMARY OF THE INVENTION

In view of the above problems in the conventional art, the present invention has an object to provide a tire capable of improving on-snow performance while maintaining steering stability on dry road by basically modifying a lug groove construction on an outboard middle land portion.

In one aspect of the invention, a tire includes a tread portion having a designated mounting direction to a vehicle, the tread portion including an outboard tread edge to be located on an outboard side of the vehicle when the tire is mounted on the vehicle, and an inboard tread edge to be located on an outboard side of the vehicle when the tire is mounted on the vehicle. The tread portion is provided with a circumferentially and continuously extending outboard shoulder main groove on the side of the outboard tread edge, a circumferentially and continuously extending outboard crown main groove disposed between the outboard shoulder main groove and a tire equator, and an outboard middle land portion disposed between the outboard shoulder main groove and the outboard crown main groove. The outboard middle land portion is provided with a plurality of first outboard middle lug grooves extending from the outboard crown main groove and terminating within the outboard middle land portion, and a plurality of second outboard middle lug grooves extending from the outboard shoulder main groove and terminating within the outboard middle land portion. The second outboard middle lug grooves are larger in length than the first outboard middle lug grooves in a tire axial direction.

In another aspect of the invention, the outboard middle land portion may be provided with a first outboard middle sipe extending axially outwardly from the outboard crown main groove and terminating within the outboard middle land portion.

In another aspect of the invention, the first outboard middle sipe may be larger in length than the outboard middle lug grooves in the tire axial direction.

In another aspect of the invention, the length of the first outboard middle sipe in the tire axial direction may be in a range of from 0.50 to 0.90 times a maximum width of the outboard middle land portion in the tire axial direction.

In another aspect of the invention, the outboard middle land portion may be provided with a second outboard middle sipe extending axially inwardly from the outboard shoulder main groove and terminating within the outboard middle land portion.

In another aspect of the invention, the outboard middle land portion may be provided with a plurality of the first outboard middle sipes and a plurality of the second outboard middle sipes, and the total number of the second outboard middle sipes may be less than the total number of the first outboard middle sipes.

In another aspect of the invention, the tread portion may be provided with an outboard shoulder land portion disposed between the outboard shoulder main groove and the outboard tread edge, the outboard shoulder land portion may be provided with an outboard shoulder lug groove extending axially inwardly from the outboard tread edge and terminating within the outboard shoulder land portion, and at least one outboard shoulder sipe extending in the tire axial direction, the at least one outboard shoulder sipe may include a first outboard shoulder sipe having axially both ends terminating within the outboard shoulder land portion, and the axially inner end of the first outboard shoulder sipe may be located axially inward of an axially inner end of the outboard shoulder lug groove.

DESCRIPTION OF THE PREFERRED EMBODIMENTS

An embodiment of the present invention will be explained below with reference to the accompanying drawings.

Figure 1:
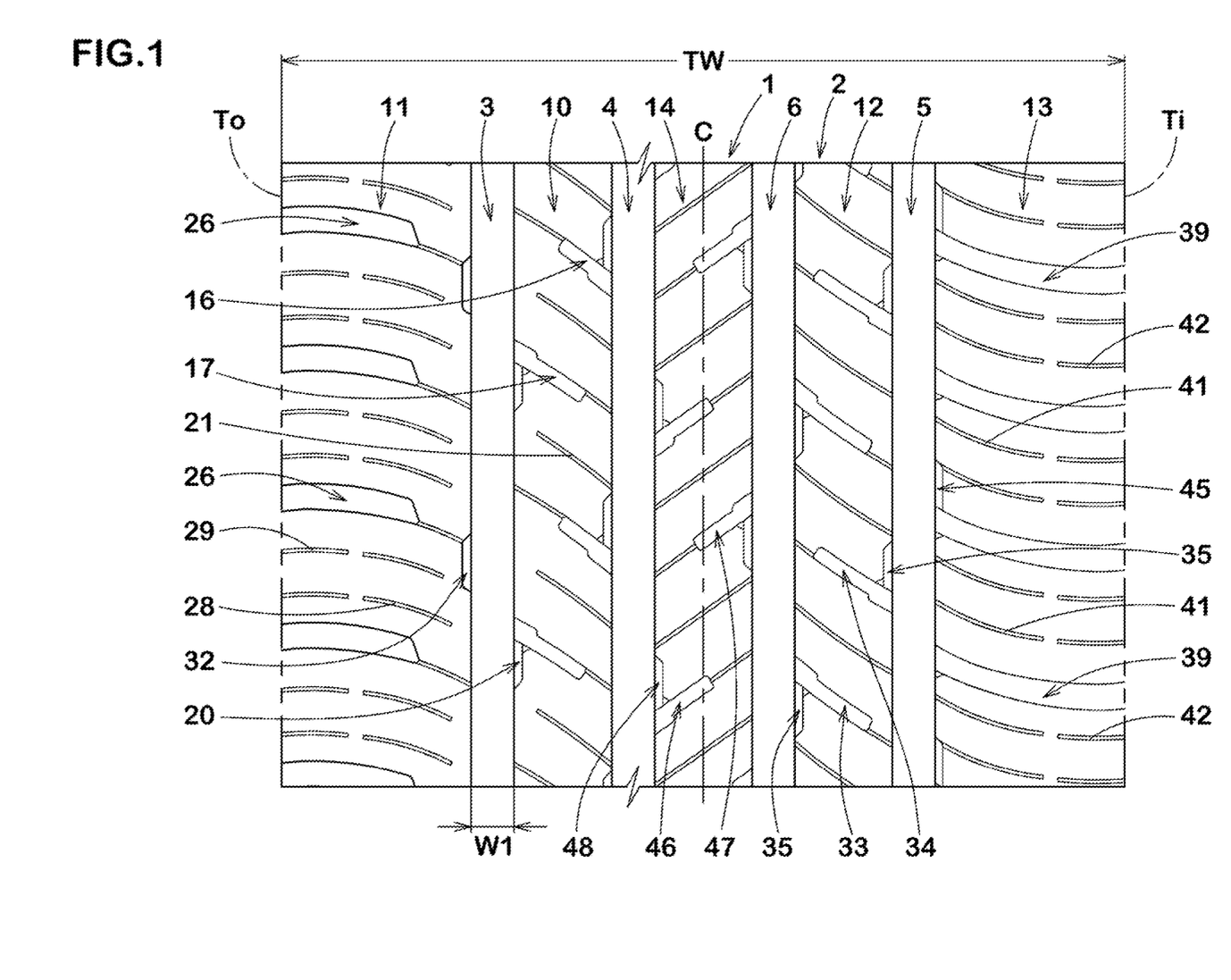
FIG. 1 is a development view of a tread portion of the tire according to an embodiment of the present invention.

FIG. 1 is a development view of a tread portion 2 of the tire 1 according to an embodiment of the present invention. In this embodiment, the tire 1, for example, may embodied not only as pneumatic tires used for passenger cars and heavy duty vehicles duty, but also as non-pneumatic tires which can support tire load by the structural members without being inflated with compressed air therein. In this embodiment, the tire 1 may preferably be embodied as pneumatic tires.

As illustrated in FIG. 1, the tread portion 2 has a non-symmetrical tread pattern having a designated mounting direction to a vehicle. The tread portion 2 includes an outboard tread edge (To) to be located on an outboard side of the vehicle when the tire 1 is mounted on the vehicle, and an inboard tread edge (Ti) to be located on an outboard side of the vehicle when the tire 1 is mounted on the vehicle. The mounting direction to a vehicle is identified on a sidewall portion (not illustrated) by characters or a mark.

As used herein, the tread edges (To) and (Ti) refer to axially outermost edges of the ground contacting patch of the tread portion 2 which occurs under a standard condition with a standard tire load when the camber angle of the tire is set to zero. The standard condition is such that the tire 1 is mounted on a standard wheel rim with a standard pressure, but is loaded with no tire load. In this application including specification and claims, various dimensions, positions and the like of the tire 1 refer to those under the standard condition of the tire unless otherwise noted.

As used herein, the standard wheel rim is a wheel rim officially recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially recommended for the tire by standards organizations, wherein the standard tire load is the "maximum load capacity" in JATMA, the "Load Capacity" in ETRTO, and the maximum value given in the above-mentioned table in TRA or the like.

In this embodiment, the tread portion 2 is provided with circumferentially and continuously extending main grooves, e.g., an outboard shoulder main groove 3, an outboard crown main groove 4, an inboard shoulder main groove 5 and an inboard crown main groove 6. As for the main grooves, the outboard shoulder main groove 3 is disposed at a location nearest to the outboard tread edge (To). The outboard crown main groove 4, for example, is provided between the outboard shoulder main groove 3 and the tire equator C. As for the main grooves, the inboard shoulder main groove 5, for example, is disposed at a location nearest to the inboard tread edge (Ti). The inboard crown main groove 6, for example, is provided between the inboard shoulder main groove 5 and the tire equator C.

For example, an axial distance from the tire equator C to the outboard shoulder main groove 3 or to the inboard shoulder main groove 5 is in a range of from 0.20 to 0.30 times the tread width TW. The tread width TW is defined as an axial distance between the outboard tread edge (To) and the inboard tread edge (Ti) under the standard condition. For example, an axial distance from the tire equator C to the outboard crown main groove 4 or to the inboard crown main groove 6 is in a range of from 0.05 to 0.10 times the tread width TW. Note that the locations of the main grooves are not particularly limited to the above ranges.

In order to improve steering stability on dry road as well as on-snow performance in a good balance, groove widths W1 of the respective main grooves 3, 4, 5 and 6, for example, are preferably in a range of from 3% to 7% of the tread width TW. In the same point of view, groove depths of the respective main grooves 3, 4, 5 and 6, for example, are preferably in a range of from 5.0 to 12.0 mm.

The tread portion 2, by being provided with the above main grooves, is separated into an outboard middle land portion 10, an outboard shoulder land portion 11, an inboard middle land portion 12, an inboard shoulder land portion 13, and the crown land portion 14.

Figure 2:
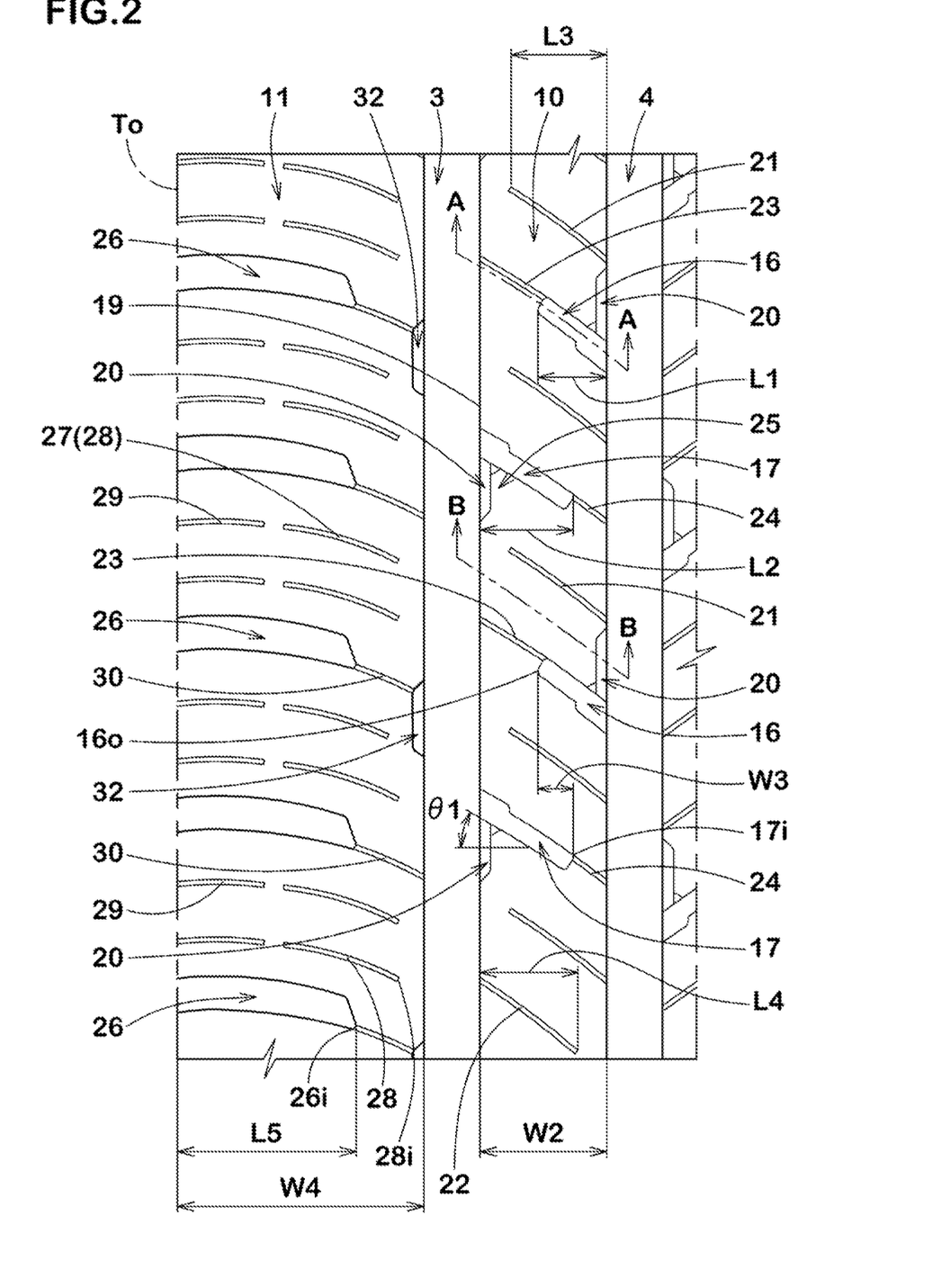
FIG. 2 is a partial enlarged view of an outboard middle land portion and an outboard shoulder land portion of FIG. 1.

FIG. 2 illustrates a partial enlarged view of the outboard middle land portion 10 and the outboard shoulder land portion 11. As illustrated in FIG. 2, the outboard middle land portion 10 is disposed between the outboard shoulder main groove 3 and the outboard crown main groove 4.

The outboard middle land portion 10 is provided with a plurality of first outboard middle lug grooves 16 extending from the outboard crown main groove 4 and terminating within the outboard middle land portion 10, and a plurality of second outboard middle lug grooves 17 extending from the outboard shoulder main groove 3 and terminating within the outboard middle land portion 10.

The lug grooves 16 and 17 terminated within the land portion as such may be useful to maintain sufficient rigidity of the outboard middle land portion 10 to ensure steering stability on dry road. Also, the lug grooves 16 and 17, in corporation with the main grooves, may improve on-snow performance by forming large snow columns and shearing them.

The axial lengths L1 of the outboard middle lug grooves 16, for example, may be set in a range of from 0.40 to 0.60 times the axial maximum width W2 of the outboard middle land portion 10. Note that the lengths L1 are not particularly limited to the above range.

The axial lengths L2 of the second outboard middle lug grooves 17 are larger than the lengths L1 of the first outboard middle lug grooves 16. Preferably, the lengths L2 of the second outboard middle lug grooves 17, for example, are in a range of from 0.70 to 0.80 times the axial maximum width W2 of the outboard middle land portion 10. The second outboard middle lug grooves 17 as such, when traveling on snow, may form large snow columns in cooperation with the outboard shoulder main groove 3, and thus improve cornering performance on snow effectively.

In order to further improve the above advantageous effects, the lengths L2 of the second outboard middle lug grooves 17, for example, are preferably not less than 1.30 times, more preferably not less than 1.35 times, preferably not more than 1.45 times, and more preferably not more than 1.40 times the lengths L1 of the first outboard middle lug grooves 16.

In this embodiment, the first outboard middle lug grooves 16 and the second outboard middle lug grooves 17 are overlapped with each other in the tire axial direction. In other words, the axially outer ends 16o of the first outboard middle lug grooves 16 are located axially outward with respect to the axially inner ends 17i of the second outboard middle lug grooves 17. The arrangement of the lug grooves 16 and 17 as such, when traveling on snow, may promote deformation of the outboard middle land portion 10 suitably to suppress that the grooves are clogged up with snow.

In order to further improve the above advantageous effects while maintaining steering stability on dry road, overlap lengths W3 between the first outboard middle lug grooves 16 and the second outboard middle lug grooves 17, for example, are preferably in a range of from 0.30 to 0.40 times the axial maximum width W2 of the outboard middle land portion 10. Note that the overlap lengths W3 correspond to axial lengths from the axially outer ends 16o of the first outboard middle lug grooves 16 to the axially inner ends 17i of the second outboard middle lug grooves 17.

Preferably, the first outboard middle lug grooves 16 and the second outboard middle lug grooves 17, for example, are inclined in the same direction with respect to the tire axial direction. The angles θ1 of the respective first outboard middle lug grooves 16 and second outboard middle lug grooves 17 with respect to the tire axial direction are preferably not less than 35 degrees, more preferably not less than 40 degrees, but preferably not more than 65 degrees, more preferably not more than 60 degrees. The lug grooves 16 and 17 as such may increase frictional force in the tire axial and circumferential directions in a good balance by offering using groove edges.

Figure 3A:
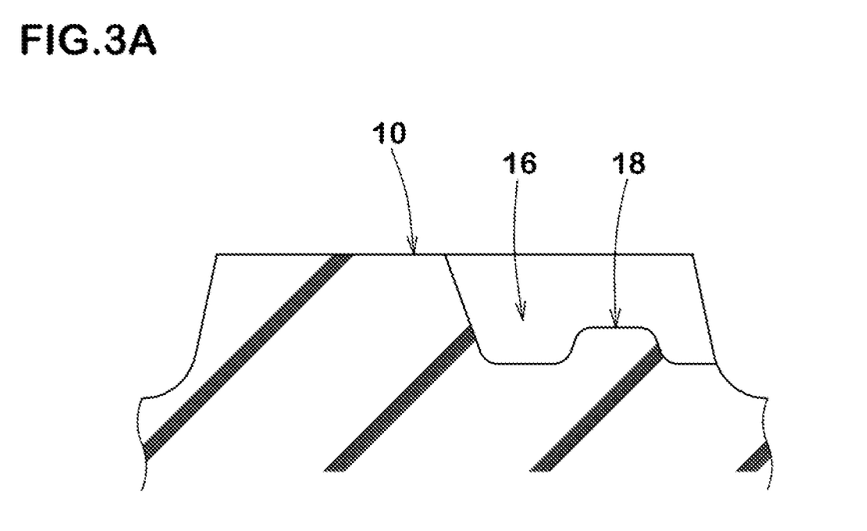
FIG. 3A is a sectional view taken along a line A-A of FIG. 2.

FIG. 3A illustrates a sectional view taken along a line A-A of FIG. 2 as a section of each of the lug grooves 16 and 17. As illustrated in FIG. 3A, in some of the first outboard middle lug grooves 16 and the second outboard middle lug grooves 17, a tie-bar 18 in which a part of the groove bottom rises may preferably be presented. The tie-bar 18 may be useful to improve steering stability on dry road by suppressing excessive opening of each of the lug grooves 16 and 17.

As illustrated in FIG. 2, the outboard middle land portion 10, for example, is provided with at least one sipe, e.g., a first outboard middle sipe 21, a second outboard middle sipe 22, a third outboard middle sipe 23, and a forth outboard middle sipe 24. As used herein, a "sipe" means a narrow cut that has a width equal to or less than 1.5 mm, which is distinguishing from a groove that has a width more than 1.5 mm.

The first outboard middle sipe 21, for example, extends axially outwardly from the outboard crown main groove 4 and terminates within the outboard middle land portion 10. The first outboard middle sipe 21, for example, is inclined in the same direction as the first outboard middle lug grooves 16. As a more preferable embodiment, the first outboard middle sipe 21, for example, extends along the first outboard middle lug grooves 16.

Preferably, the axial length L3 of the first outboard middle sipe 21, for example, is larger than the axial lengths L1 of the first outboard middle lug grooves 16. The axial length L3 of the first outboard middle sipe 21, for example, is in a range of from 0.50 to 0.90 times the axial maximum width W2 of the outboard middle land portion 10. The first outboard middle sipe 21 may be useful to improve on-ice performance.

The second outboard middle sipe 22 extends axially inwardly from the outboard shoulder main groove 3 and terminates within the outboard middle land portion 10. The second outboard middle sipe 22, for example, is inclined in the same direction as the second outboard middle lug grooves 17. As a more preferable embodiment, the second outboard middle sipe 22, for example, extends along the second outboard middle lug grooves 17.

The axial length L4 of the second outboard middle sipe 22, for example, is in a range of from 0.50 to 0.90 times the axial maximum width W2 of the outboard middle land portion 10. Preferably, the axial length L4 of the second outboard middle sipe 22, for example, is the same as the axial length L3 of the first outboard middle sipe 21.

In this embodiment, a plurality of the first outboard middle sipe 21 and a plurality of the second outboard middle sipes 22 are provided on the outboard middle land portion 10. Preferably, in the outboard middle land portion 10, the total number N2 of the second outboard middle sipes 22 is less than the total number of the first outboard middle sipes 21. The arrangement of sipes 21 and 22 as such may be useful to suppress reduction of rigidity of the outside the outboard middle land portion 10.

The third outboard middle sipe 23 extends from one of the first outboard middle lug grooves 16 to the outboard shoulder main groove 3. The third outboard middle sipe 23, for example, is inclined in the same direction as the first outboard middle lug grooves 16. The fourth outboard middle sipe 24 extends from one of the second outboard middle lug grooves 17 to the outboard crown main groove 4. The fourth outboard middle sipe 24, for example, is inclined in the same direction as the second outboard middle lug grooves 17.

As a more preferable embodiment, the outboard middle land portion 10 may be provided with a chamfered portion 20.

Figure 3B:
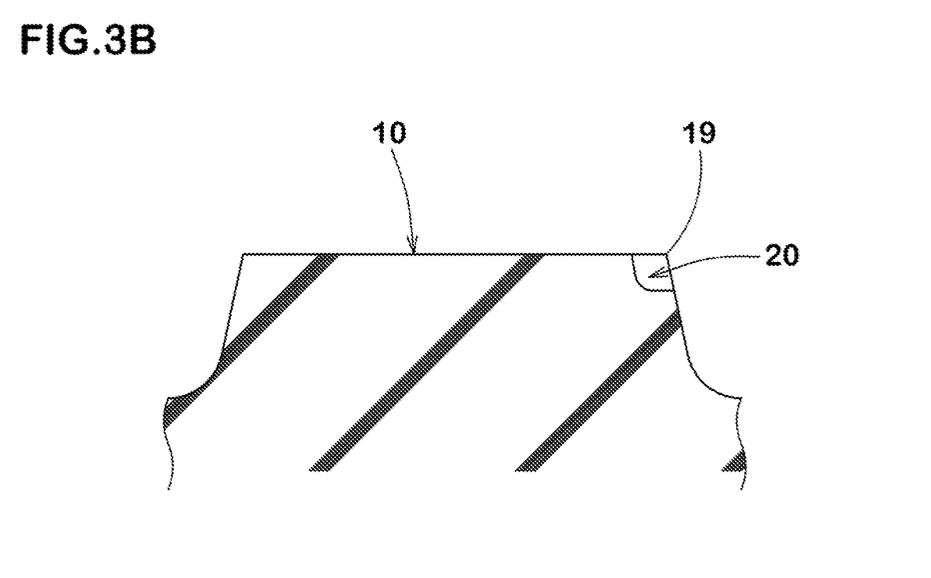
FIG. 3B is a cross-sectional view taken along a line B-B of FIG. 2.

FIG. 3B illustrates a cross-sectional view taken along a line B-B of FIG. 2, as a sectional view of the chamfered portion 20. As illustrated in FIG. 3B, the chamfered portion 20, for example, is a dented region which is formed on a corner portion 19 of the land portion between the ground contact surface and the sidewall. Note that chamfered portions formed on the other land portion, which will be described later, are also configured as the same as the chamfered portion 20 illustrated in FIG. 3B.

As illustrated in FIG. 2, the chamfered portion 20 in this embodiment, for example, is provided at a part 25 of the corner portion 19 of the outboard middle land portion 10 where one of the lug grooves 16 and 17 intersects with one of the main groove 3 and 4 with an acute angle. The chamfered portion 20 as such may suppress occurring crack on the part 25 effectively so as to prevent from uneven wear of the outboard middle land portion 10.

The outboard shoulder land portion 11, for example, is disposed between the outboard shoulder main groove 3 and the outboard tread edge (To). The outboard shoulder land portion 11, for example, is provided with a plurality of outboard shoulder lug grooves 26 and at least one outboard shoulder sipe 27 extending in the tire axial direction.

The outboard shoulder lug grooves 26, for example, extend axially inwardly from the outboard tread edge (To) and terminate within the outboard shoulder land portion 11. The axial lengths L5 of the outboard shoulder lug grooves 26, for example, are in a range of from 0.60 to 0.80 times the axial maximum width W4 of the outboard shoulder land portion 11.

The at least one outboard shoulder sipe 27, for example, includes a first outboard shoulder sipe 28 having axially both ends terminating within the outboard shoulder land portion 11. The axially inner end 28i of the first outboard shoulder sipe 28, for example, is located axially inward of the axially inner ends 26i of the outboard shoulder lug grooves 26. The first outboard shoulder sipes 28 as such, when traveling on dry road, may suppress strain of axially inner side of the outboard shoulder land portion 11 so as to prevent from uneven wear of the outboard shoulder land portion 11.

In this embodiment, the at least one outboard shoulder sipe 27 further includes the second outboard shoulder sipe 29 located axially outward of the first outboard shoulder sipe 28 and a third outboard shoulder sipes 30 extending from each of the outboard shoulder lug grooves 26 to the outboard shoulder main groove 3.

The second outboard shoulder sipe 29, for example, extends axially inwardly from the outboard tread edge (To) and terminates within the outboard shoulder land portion 11. In a preferred aspect, the second outboard shoulder sipe 29, for example, is provided at a location where the first outboard shoulder sipe 28 is extended toward axially outwardly.

The outboard shoulder land portion 11 is preferably provided with a chamfered portion 32. The chamfered portion 32 on the outboard shoulder land portion 11, for example, may be connected with the third outboard shoulder sipe 30. Thus, uneven wear around axially inner end of the third outboard shoulder sipe 30 can be suppressed.

Figure 4:
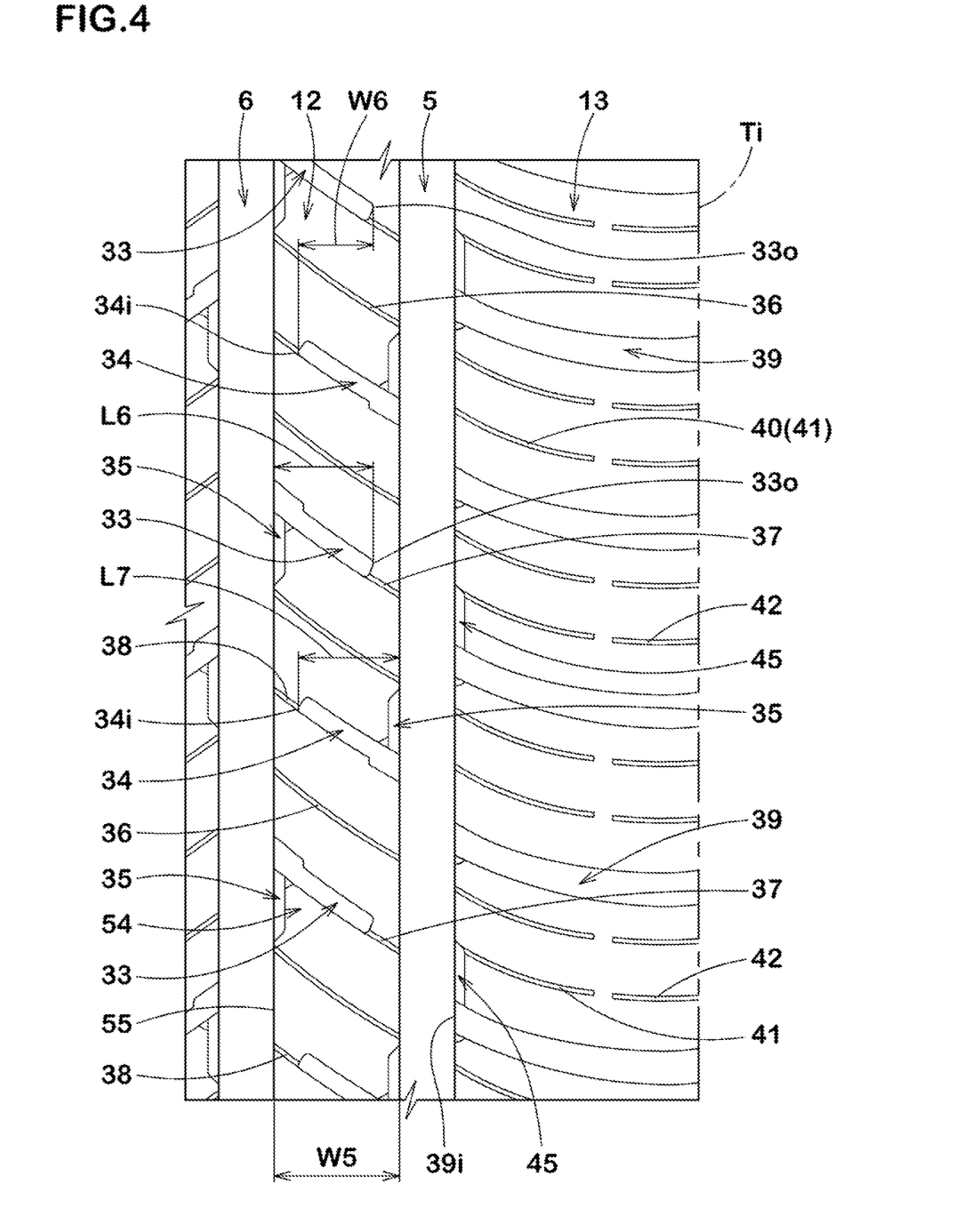
FIG. 4 is an enlarged view of an inboard middle land portion and an inboard shoulder land portion of FIG. 1.

FIG. 4 illustrates an enlarged view of the inboard middle land portion 12 and the inboard shoulder land portion 13. As illustrated in FIG. 4, the inboard middle land portion 12, for example, is disposed between the inboard shoulder main groove 5 and the inboard crown main groove 6.

The inboard middle land portion 12 is provided with a first inboard middle lug grooves 33 extending from the inboard crown main groove 6 and terminating within the inboard middle land portion 12, and a plurality of second inboard middle lug grooves 34 extending from the inboard shoulder main groove 5 and terminating within the inboard middle land portion 12.

Preferably, the axial lengths L6 of the first inboard middle lug grooves 33 and the axial lengths L7 of the second inboard middle lug grooves 34, for example, are in a range of from 0.50 to 0.90 times the axial width W5 of the inboard middle land portion 12. Note that the lengths L6 and L7 are not particularly limited to the range as such.

In a preferred aspect, the lengths L6 of the first inboard middle lug grooves 33 are substantially the same as the lengths L7 of the second inboard middle lug grooves 34. The construction of the lug grooves 33 and 34 as such can make the inboard middle land portion 12 wear evenly.

In this embodiment, the first inboard middle lug grooves 33 are overlapped with the second inboard middle lug grooves 34 in the tire axial direction. In other words, the axially outer ends 33o of the first inboard middle lug grooves 33 are located axially outward with respect to the axially inner ends 34i of the second inboard middle lug grooves 34. The arrangement of the lug grooves 33 and 34 as such, when traveling on snow, may promote deformation of the inboard middle land portion 12 and then may suppress that the grooves are clogged up with snow.

The lug grooves 33 and 34 provided on the inboard middle land portion 12 tend to be clogged up with snow easily compared with the lug grooves 16 and 17 provided on the outboard middle land portion 10. Thus, the overlap lengths W6 between the first inboard middle lug grooves 33 and the second inboard middle lug grooves 34, for example, are preferably greater than the overlap lengths W3 (shown in FIG. 2) between the first outboard middle lug grooves 16 and the second outboard middle lug grooves 17 in order to further improve the above advantageous effects. Preferably, the overlap lengths W6 are in a range of from 1.80 to 2.20 times the overlap lengths W3. Thus, the lug grooves 33 and 34 can suppress being clogged up with snow when traveling on snow while maintaining steering stability on dry road. Note that the overlap lengths W6 correspond to axial directions between the axially outer ends 33o of the first inboard middle lug grooves 33 and the axially inner ends 34i of the second inboard middle lug grooves 34.

In this embodiment, the inboard middle land portion 12, for example, is provided with a first inboard middle sipe 36, a second inboard middle sipe 37, and a third inboard middle sipe 38.

The first inboard middle sipe 36, for example, traverses the inboard middle land portion 12 over the entire length. The first inboard middle sipe 36 may improve on-ice performance effectively.

The second inboard middle sipe 37 extends from one of the first inboard middle lug grooves 33 to the inboard shoulder main groove 5. The third inboard middle sipe 38 extends from one of the second inboard middle lug grooves 34 to the inboard crown main groove 6.

Preferably, the inboard middle land portion 12 is further provided with a chamfered portion 35. The chamfered portion 35, for example, is provided at a part 54 of the corner portion 55 of the inboard middle land portion 12 where one of the lug grooves 33 and 34 intersects with one of the main groove 5 and 6 with an acute angle. The chamfered portion 35 as such may suppress occurring crack on the part 54 effectively.

The inboard shoulder land portion 13, for example, is disposed between the inboard shoulder main groove 5 and the inboard tread edge (Ti). The inboard shoulder land portion 13, for example, is provided with a plurality of inboard shoulder lateral grooves 39 and at least one inboard shoulder sipe 40 extending in the tire axial direction.

The inboard shoulder lateral grooves 39, for example, extend from the inboard tread edge (Ti) to the inboard shoulder main groove 5. The inboard shoulder lateral grooves 39 as such, when traveling on snow, may form large snow columns in cooperation with the inboard shoulder main groove 5.

The at least one inboard shoulder sipe 40, for example, includes a first inboard shoulder sipe 41 and a second inboard shoulder sipe 42. The first inboard shoulder sipe 41, for example, extends axially outwardly from the inboard shoulder main groove 5 and terminates within the inboard shoulder land portion 13.

The second inboard shoulder sipe 42, for example, is provided axially outward of the first inboard shoulder sipe 41. The second inboard shoulder sipe 42, for example, extends axially inwardly from the inboard tread edge Ti and terminates within the inboard shoulder land portion 13. Preferably, the second inboard shoulder sipe 42, for example, is provided at a location where the first inboard shoulder sipe 41 is extended axially outwardly.

Preferably, the inboard shoulder land portion 13 may be provided with a chamfered portion 45. The chamfered portion 45, for example, is connected to one of the inboard shoulder lateral grooves 39 at the axially inner end 39i. The chamfered portion 45 as such may suppress uneven wear on the inboard shoulder land portion 13.

Figure 5:
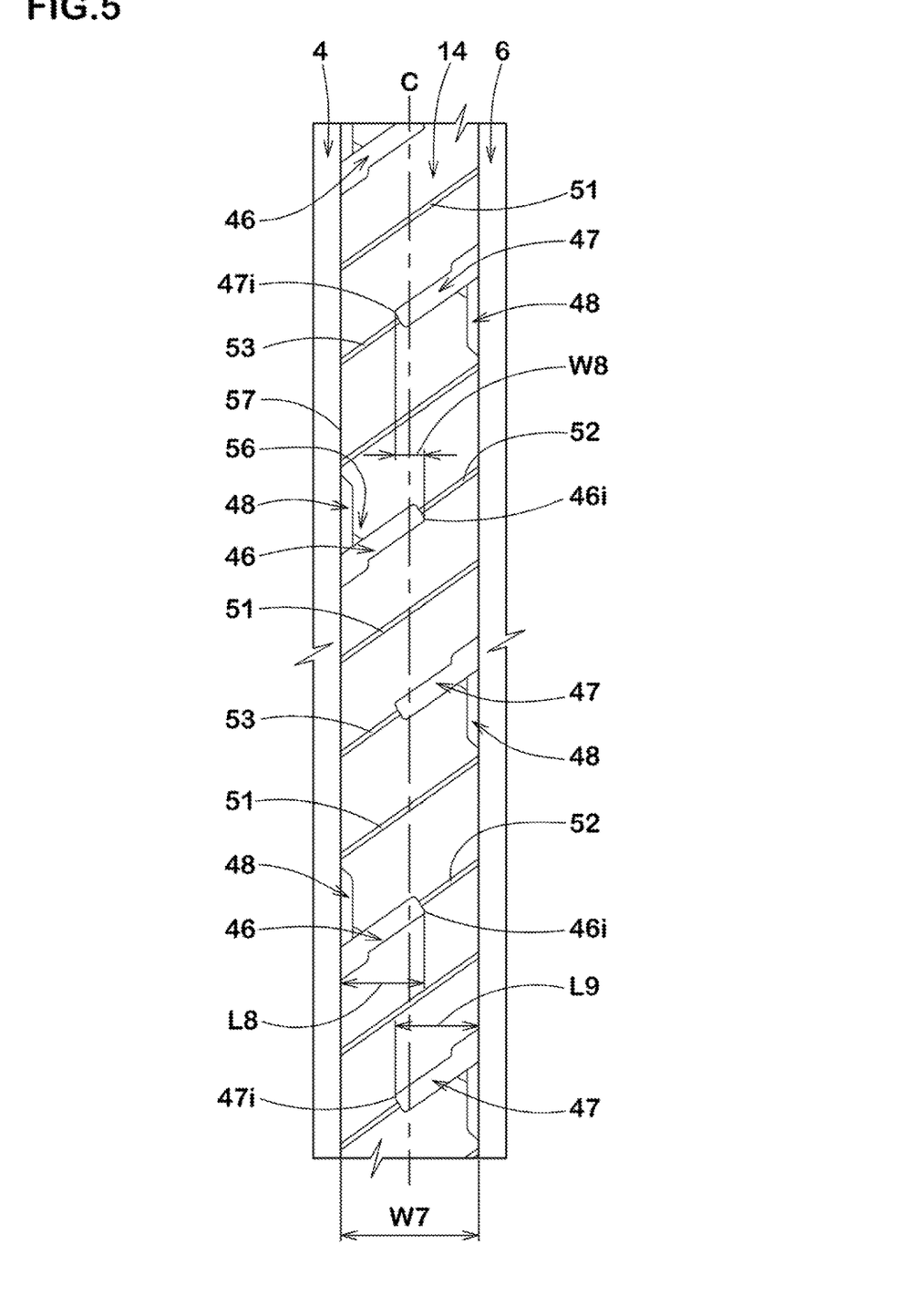
FIG. 5 is an enlarged view of a crown land portion of FIG. 1.

FIG. 5 illustrates an enlarged view of the crown land portion 14. As illustrated in FIG. 5, the crown land portion 14 is disposed between the outboard crown main groove 4 and the inboard crown main groove 6.

The crown land portion 14 is provided with a plurality of first crown lug grooves 46 extending from the outboard crown main groove 4 and terminating within the crown land portion 14, and a plurality of second crown lug grooves 47 extending from the inboard crown main groove 6 and terminating within the crown land portion 14.

For example, the axial lengths L8 of the first crown lug grooves 46 and the axial lengths L9 of the second crown lug grooves 47 are preferably in a range of from 0.40 to 0.60 times the axial width W7 of the crown land portion 14. In a preferred aspect, the lengths L8 of the first crown lug grooves 46 are the same as the lengths L9 of the second crown lug grooves 47. Note that the lengths L8 and L9 are not particularly limited to the above range.

In this embodiment, the first crown lug grooves 46 are overlapped with the second crown lug grooves 47 in the tire axial direction. In other words, the terminal ends 46i of the first crown lug grooves 46 are located on the side of the inboard tread edge Ti with respect to the terminal ends 47i of the second crown lug grooves 47. The arrangement of the lug grooves 46 and 47 as such, when traveling on snow, may promote deformation of the crown land portion 14 suitably and may suppress that the lug grooves are clogged up with snow.

In order to improve the steering stability on dry road, the crown land portion 14 preferably has rigidity greater higher than that of the inboard middle land portion 12. Thus, the overlap lengths W8 between the first crown lug grooves 46 and the second crown lug grooves 47, for example, are preferably smaller than the overlap lengths W6 (shown in FIG. 4) between the first inboard middle lug grooves 33 and the second inboard middle lug grooves 34. More preferably, the overlap lengths W8 are in a range of from 0.30 to 0.50 times the overlap length W6. Note that the overlap lengths W8 each correspond to the axial length from the terminal end 46*i* of one of the first crown lug grooves 46 to the terminal end 47*i* of one of the second crown lug grooves 47 which is adjacent thereto.

In this embodiment, the crown land portion 14, for example, is provided with a first crown sipe 51, a second crown sipe 52, and a third crown sipe 53.

Figure 6:
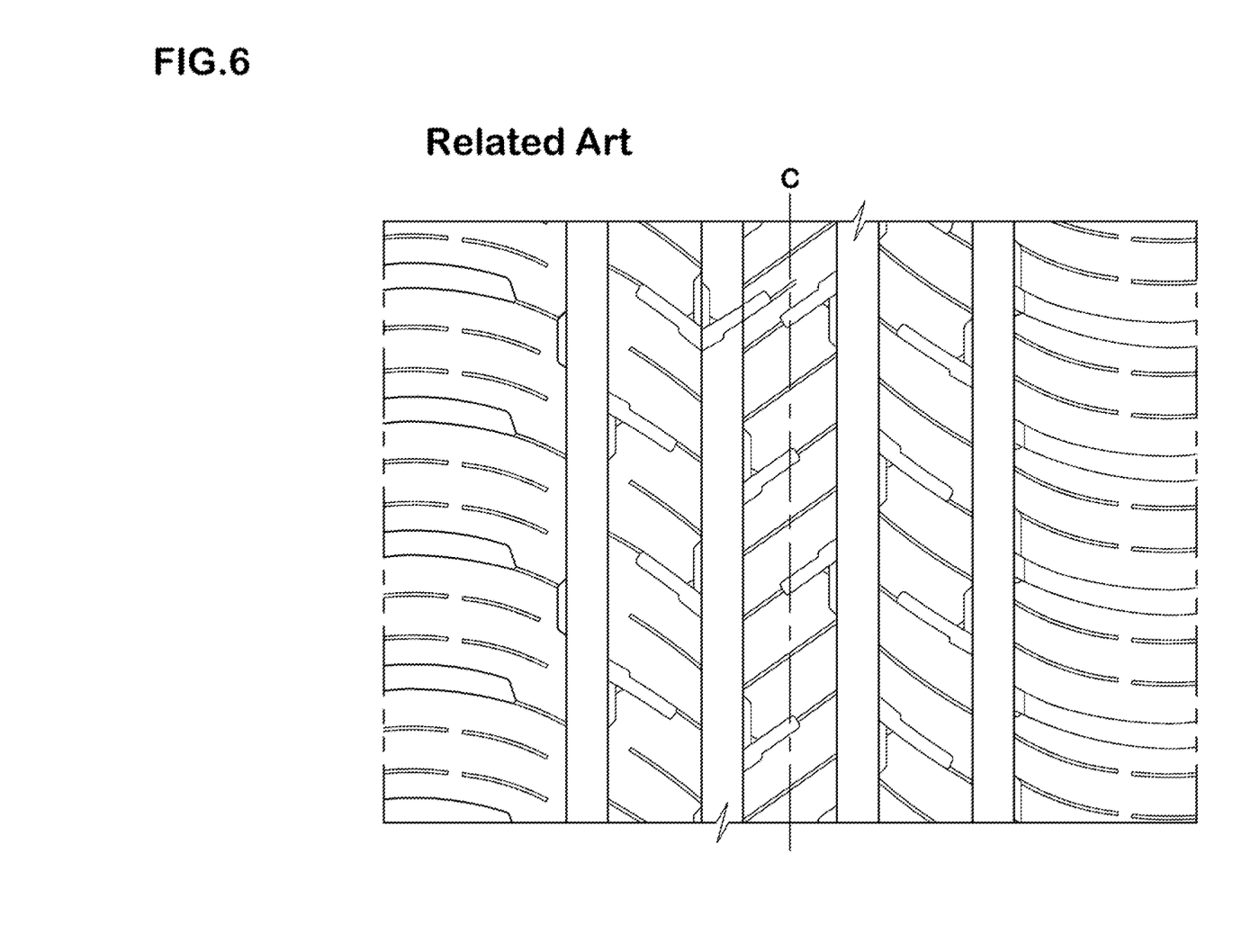
FIG. 6 is a development view of a tread portion of a tire according to reference example 1.

The first crown sipe 51, for example, traverses over the entire length of the crown land portion 14. The second crown sipe 52, for example, extends from one of the first crown lug grooves 46 to the inboard crown main groove 6. The third crown sipe 53, for example, extends from one of the second crown lug grooves 47 to the outboard crown main groove 4. These sipes 51, 52 and 53 may improve on-ice performance effectively.

the second outboard middle lug grooves which were the same lengths was manufactured as illustrated in FIG. 6. Then, steering stability on dry road and on-snow performance of the tires were tested. The common specification of each of the test tires and the test methods are as follows.

Rim: 15×6J
Tire inner pressure: 200 kPa
Test vehicle: FF with displacement of 1600 cc
Tire mounting locations: All wheels Steering stability test on dry road:
A driver drove the test vehicle on dry road, and then evaluated the steering stability by his feeling. The test results are shown in table 1 using a score system, wherein the score of the reference tire is set to 100. The larger the value, the better the steering stability performance is.

On-snow performance test:
A driver drove the test vehicle on snow, and then evaluated traction, braking property and cornering performance by his feeling. The test results are shown in table 1 using a score system, wherein the score of the reference tire is set to 100. The larger the value, the better the on-snow performance is.

The test results are shown in Table 1.

TABLE 1

|  | Ref. | Ex. 1 | Ex. 2 | Ex. 3 | Ex. 4 | Ex. 5 | Ex. 6 | Ex. 7 |
| --- | --- | --- | --- | --- | --- | --- | --- | --- |
| Tread pattern configuration | FIG. 6 | FIG. 1 | FIG. 1 | FIG. 1 | FIG. 1 | FIG. 1 | FIG. 1 | FIG. 1 |
| Lengths L1 of first outboard middle lug grooves/maximum width W2 of outboard middle land portion | 0.50 | 0.50 | 0.50 | 0.50 | 0.50 | 0.55 | 0.60 | 0.65 |
| Lengths L2 of second outboard middle lug grooves/maximum width W2 of outboard middle land portion | 0.50 | 0.75 | 0.65 | 0.70 | 0.80 | 0.75 | 0.75 | 0.75 |
| Steering stability on dry road (score) | 100 | 100 | 100 | 100 | 99 | 100 | 98 | 97 |
| On-snow performance (score) | 100 | 107 | 104 | 107 | 108 | 109 | 109 | 109 |

In a preferred aspect, the crown land portion 14, for example, is provided with a chamfered portion 48. The chamfered portion 48 of the crown land portion 14, for example, is provided at a part 56 of the corner portion 57 where one of the lug grooves intersects with one of the main grooves at an acute angle. The chamfered portion 35 as such may suppress occurring crack on the part 56 effectively.

While the particularly preferable embodiments in accordance with the present invention have been described in detail, the present invention is not limited to the illustrated embodiments, but can be modified and carried out in various aspects.

EXAMPLES

Tires 195/65R15 having the basic tread pattern as illustrated in FIG. 1 were manufactured based on the details shown in Table 1. As a reference, a tire having a tread portion provided with the outboard middle lug grooves and From the test results, it is confirmed that the example tires improve on-snow performance while maintaining steering stability on dry road.

What is claimed is:

1. A tire comprising:

a tread portion having a designated mounting direction to a vehicle, the tread portion comprising an outboard tread edge to be located on an outboard side of the vehicle when the tire is mounted on the vehicle, and an inboard tread edge to be located on an outboard side of the vehicle when the tire is mounted on the vehicle;

the tread portion being provided with a circumferentially and continuously extending outboard shoulder main groove on the side of the outboard tread edge, a circumferentially and continuously extending outboard crown main groove disposed between the outboard shoulder main groove and a tire equator, and an outboard middle land portion disposed between the outboard shoulder main groove and the outboard crown main groove; and the outboard middle land portion being provided with a plurality of first outboard middle lug grooves extending from the outboard crown main groove and terminating within the outboard middle land portion, and a plurality of second outboard middle lug grooves extending from the outboard shoulder main groove and terminating within the outboard middle land portion, wherein the second outboard middle lug grooves are larger in length than the first outboard middle lug grooves in a tire axial direction, wherein the first outboard middle lug grooves and the second outboard middle lug grooves are inclined in the same direction with one another with respect to a tire axial direction; and the outboard middle land portion is provided with a third outboard middle sipe extending from one of the first outboard middle lug grooves to the outboard shoulder main groove.

2. The tire according to claim 1, wherein the outboard middle land portion is provided with a first outboard middle sipe extending axially outwardly from the outboard crown main groove and terminating within the outboard middle land portion.

3. The tire according to claim 2, wherein the first outboard middle sipe is larger in length than the outboard middle lug grooves in the tire axial direction.

4. The tire according to claim 3, wherein the length of the first outboard middle sipe in the tire axial direction is in a range of from 0.50 to 0.90 times a maximum width of the outboard middle land portion in the tire axial direction.

5. The tire according to claim 2, wherein the outboard middle land portion is provided with a second outboard middle sipe extending axially inwardly from the outboard shoulder main groove and terminating within the outboard middle land portion.

6. The tire according to claim 3, wherein the outboard middle land portion is provided with a second outboard middle sipe extending axially inwardly from the outboard shoulder main groove and terminating within the outboard middle land portion.

7. The tire according to claim 4, wherein the outboard middle land portion is provided with a second outboard middle sipe extending axially inwardly from the outboard shoulder main groove and terminating within the outboard middle land portion.

8. The tire according to claim 5, wherein
the outboard middle land portion is provided with a plurality of the first outboard middle sipes and a plurality of the second outboard middle sipes, and
the total number of the second outboard middle sipes is less than the total number of the first outboard middle sipes.

9. The tire according to claim 1, wherein
the tread portion is provided with an outboard shoulder land portion disposed between the outboard shoulder main groove and the outboard tread edge,
the outboard shoulder land portion is provided with an outboard shoulder lug groove extending axially inwardly from the outboard tread edge and terminating within the outboard shoulder land portion, and at least one outboard shoulder sipe extending in the tire axial direction, the at least one outboard shoulder sipe comprises a first outboard shoulder sipe having axially both ends terminating within the outboard shoulder land portion, and
the axially inner end of the first outboard shoulder sipe is located axially inward of an axially inner end of the outboard shoulder lug groove.

10. The tire according to claim 1, wherein the first outboard middle lug grooves and the second outboard middle lug grooves overlap with each other in the tire axial direction.

11. The tire according to claim 2, wherein
groove widths of the first outboard middle lug grooves and the second outboard middle lug grooves are more than 1.5 mm, and
a width of the first outboard middle sipe is equal to or less than 1.5 mm.

12. The tire according to claim 1, wherein the third outboard middle sipe is inclined in a same direction as the first outboard middle lug grooves.

13. A tire comprising:
a tread portion having a designated mounting direction to a vehicle, the tread portion comprising an outboard tread edge to be located on an outboard side of the vehicle when the tire is mounted on the vehicle, and an inboard tread edge to be located on an outboard side of the vehicle when the tire is mounted on the vehicle;
the tread portion being provided with a circumferentially and continuously extending outboard shoulder main groove on the side of the outboard tread edge, a circumferentially and continuously extending outboard crown main groove disposed between the outboard shoulder main groove and a tire equator, and an outboard middle land portion disposed between the outboard shoulder main groove and the outboard crown main groove; and
the outboard middle land portion being provided with a plurality of first outboard middle lug grooves extending from the outboard crown main groove and terminating within the outboard middle land portion, and a plurality of second outboard middle lug grooves extending from the outboard shoulder main groove and terminating within the outboard middle land portion, wherein the second outboard middle lug grooves are larger in length than the first outboard middle lug grooves in a tire axial direction,
wherein the first outboard middle lug grooves and the second outboard middle lug grooves are inclined in the same direction with one another with respect to a tire axial direction; and the outboard middle land portion is provided with a fourth outboard middle sipe extending from one of the second outboard middle lug grooves to the outboard crown main groove.

14. The tire according to claim 13, wherein the fourth outboard middle sipe is inclined in a same direction as the second outboard middle lug grooves.

15. A tire comprising:
a tread portion having a designated mounting direction to a vehicle, the tread portion comprising an outboard tread edge to be located on an outboard side of the vehicle when the tire is mounted on the vehicle, and an inboard tread edge to be located on an outboard side of the vehicle when the tire is mounted on the vehicle;
the tread portion being provided with a circumferentially and continuously extending outboard shoulder main groove on the side of the outboard tread edge, a circumferentially and continuously extending outboard crown main groove disposed between the outboard shoulder main groove and a tire equator, and an outboard middle land portion disposed between the outboard shoulder main groove and the outboard crown main groove; and the outboard middle land portion being provided with a plurality of first outboard middle lug grooves extending from the outboard crown main groove and terminating within the outboard middle land portion, and a plurality of second outboard middle lug grooves extending from the outboard shoulder main groove and terminating within the outboard middle land portion, wherein the second outboard middle lug grooves are larger in length than the first outboard middle lug grooves in a tire axial direction, wherein the first outboard middle lug grooves and the second outboard middle lug grooves are inclined in the same direction with one another with respect to a tire axial direction, the outboard middle land portion is provided with a chamfered portion, the chamfered portion is a dented region which is formed on a corner portion of the outboard middle land portion between a ground contact surface thereof and a sidewall thereof, and in a plan view of the outboard middle land portion, the chamfered portion is provided at a part of the corner portion of the outboard middle land portion wherein either one of the first outboard middle lug grooves and the second outboard middle lug grooves intersects with either one of the outboard shoulder main groove and the outboard crown main groove.

16. The tire according to claim 15, wherein the chamfered portion, in a plan view of the outboard middle land portion, has a circumferential length thereof greater than an axial length thereof.

17. The tire according to claim 15, wherein the chamfered portion has one circumferential end communicated with either one of the first outboard middle lug grooves and the second outboard middle lug grooves and the other circumferential end which is not communicated with any other grooves.

18. The tire according to claim 9, wherein the at least one outboard shoulder sipe comprises a second outboard shoulder sipe located axially outward of the first outboard shoulder sipe.

19. The tire according to claim 9, wherein the second outboard shoulder sipe is provided at a location where the first outboard shoulder sipe is extended toward axially outwardly.

* * * * *